(12) United States Patent
Kimoto et al.

(10) Patent No.: US 6,610,439 B1
(45) Date of Patent: Aug. 26, 2003

(54) MOUNTING STRUCTURE FOR TEMPERATURE DETECTING MEMBER IN RECHARGEABLE BATTERY

(75) Inventors: Shinya Kimoto, Toyohashi (JP); Ko Watanabe, Toyohashi (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 93 days.

(21) Appl. No.: 09/613,628

(22) Filed: Jul. 11, 2000

(30) Foreign Application Priority Data

Jul. 16, 1999 (JP) ............................................. 11-203534

(51) Int. Cl.$^7$ ........................ H01M 10/48; H01M 2/02; H01M 2/04; H01M 2/00
(52) U.S. Cl. .............................. 429/90; 429/62; 429/93; 429/120; 429/163; 429/175; 374/208
(58) Field of Search .......................... 429/62, 90, 120, 429/93, 163, 175; 374/208

(56) References Cited

U.S. PATENT DOCUMENTS

| | | | | |
|---|---|---|---|---|
| 4,453,835 A | * | 6/1984 | Clawson et al. .............. | 374/185 |
| 4,752,543 A | * | 6/1988 | Anderson et al. ............ | 429/179 |
| 5,261,806 A | * | 11/1993 | Pleasant ...................... | 425/144 |
| 5,463,375 A | * | 10/1995 | Bauer ........................... | 340/517 |
| 6,003,379 A | * | 12/1999 | Ichikawa et al. ............. | 73/708 |
| 6,296,966 B1 | * | 10/2001 | Verhoog et al. .............. | 429/163 |

FOREIGN PATENT DOCUMENTS

| | | |
|---|---|---|
| DE | 4400461 | 1/1995 |
| EP | 0312940 | 4/1989 |
| JP | 63-32874 | 2/1988 |
| JP | 9-120846 | 5/1997 |

OTHER PUBLICATIONS

English Language Abstract of DE 44 00 461 C1, Jan. 1995.
Patent Abstracts of Japan, vo. 012, No. 244, published Jul. 9, 1988.
English Language Abstract of JP 9–120846, May 1997.

* cited by examiner

*Primary Examiner*—Randy Gulakowski
*Assistant Examiner*—Jonathan Crepeau
(74) *Attorney, Agent, or Firm*—Greenblum & Bernstein, P.L.C.

(57) ABSTRACT

A temperature detection hole 12 having a bottom, which is sealed against the inside of the battery case 3 while being open to the outside, is formed in the battery case. The bottom wall 12a of the temperature detection hole is in contact with or in close proximity to the elements for electromotive force. Engaging hooks 14 are formed on lateral portions of the temperature detection hole 12 of the battery case 3, while a temperature sensor 13 is provided with elastically deformable engaging flanges 21. When the temperature sensor 13 is mounted removably in the temperature detection hole 12, the elastic restorative force of the engaging flanges 21 that are engaged in elastic deformation with the engaging hooks 14 is applied to the temperature sensor 13. The sensor end 13a of the temperature sensor 13 is thereby pressed against the bottom wall 12a of the temperature detection hole 12.

24 Claims, 7 Drawing Sheets

MOUNTING STRUCTURE FOR TEMPERATURE DETECTING MEMBER IN RECHARGEABLE BATTERY

BACKGROUND OF THE INVENTION

1. Field of the Invention

The present invention relates to a rechargeable battery, and more particularly, to an improvement of the temperature detection portion in a sealed rechargeable battery wherein elements for electromotive force are accommodated in a sealed battery case.

2. Description of Related Art

For the temperature detection mechanism in sealed rechargeable batteries, which are used, for example, in electric vehicles, an embedded-type structure is known, wherein a temperature sensing element is integrally provided in the battery case. In order to detect the internal temperature of the battery while keeping the inside thereof airtight, a temperature detection hole having a bottom is formed in the battery case, which is sealed against the inside of the battery case and open to the outside, and a temperature sensor element is inserted into this temperature detection hole, which is then filled with a synthetic resin to integrate it into one piece with the battery case.

In Japanese Published Unexamined Patent Application No. 9-120846, a configuration is disclosed, in which a temperature sensor is inserted into a temperature detection hole having a bottom, as described above, and bonded or welded with an adhesive or a resin, or fixed by other means, so that the temperature inside the battery can be detected from outside the battery.

However, in such embedded-type temperature detection mechanism, there is the danger that the precision and the responsiveness of the temperature sensing element deteriorates depending on how it is mounted in the battery case. Moreover, it is difficult to determine whether the arrangement of the temperature sensing element is appropriate. For the purpose of embedding the temperature sensor in the hole, the manufacturing process of the battery case is relatively complicated, with the result that costs become high and handling is not easy. Moreover, there is the problem that maintenance is not easy, since it is necessary to exchange also the temperature sensor as well as the wiring when batteries are to be exchanged.

In the configuration disclosed in the above mentioned publication, a separate temperature sensor is inserted into a temperature detection hole having a bottom in the battery case. However, this publication does not particularly show a means for inserting the temperature sensor in the temperature detection hole without creating a gap with the walls of the temperature detection hole, and it is not clear whether it is actually possible to perform temperature detection with high precision and responsiveness.

SUMMARY OF THE INVENTION

In view of these problems of the prior art, it is an object of the present invention to provide a rechargeable battery, in which the temperature of the elements for electromotive force in a sealed battery case can be detected with high precision and responsiveness, and which has good operability with regard to assembly and maintenance.

To achieve the above object, the present invention provides a rechargeable battery, comprising: a battery case for accommodating therein elements for electromotive force in a sealed condition; a temperature detection hole which is defined by a cylindrical cavity having a bottom formed in the battery case; a temperature sensor mounted in the temperature detection hole, having a sensing end at a lower end thereof; and a mounting means for mounting the temperature sensor removably in the temperature detection hole such that the sensing end at the lower end of the temperature sensor is tightly pressed against the bottom of the temperature detection hole. Since the temperature inside the battery is detected through the bottom wall of the temperature detection hole while the inside of the battery case remains tightly sealed, and since the sensing end of the temperature sensor is pressed against the bottom wall of the temperature detection hole, the battery temperature can be detected with high precision and responsiveness. Moreover, since the temperature sensor can be removed from the temperature detection hole of the battery case, the operability when attaching the temperature sensor and when replacing the batteries for maintenance is good.

Specifically, an engaging hook is provided at an edge portion of the temperature detection hole in the battery case, while an engaging flange that is elastically deformable is formed on the temperature sensor, so that, when the temperature sensor is mounted in the temperature detection hole, the elastic restorative force of the engaging flange that is engaged in elastic deformation with the engaging hook exerts pressure on the temperature sensor. Thus the temperature sensor can be mounted with one-touch operation. In addition, the elastic restorative force of the engaging flange presses the sensing end of the temperature sensor securely against the bottom wall of the temperature detection hole.

The temperature detection hole and the temperature sensor respectively have small-diameter portions at their lower ends, so that heat is conducted to the sensing end of the temperature sensor not only from the bottom wall of the temperature detection hole, but also from the vicinity thereof, which enables temperature detection with even higher precision and responsiveness, because the thermal capacity of the temperature detection portion is small.

The temperature sensor comprises a cylindrical sensor case having a bottom wall, and a sensing element inserted into the sensor case such as to contact the bottom wall of the sensor case, the interior of the sensor case being filled with a resin. Thanks to the construction wherein the sensing element is arranged inside the sensor case and formed in one piece with the sensor case, there is no danger that the leads break off the sensing element, whereby handling is made easier, and temperature detection with high responsiveness and smooth thermal conduction becomes possible. The responsiveness of the temperature sensor can be further improved by making the bottom wall of the sensor case thinner.

Alternatively, the temperature sensor comprises a cylindrical sensor case without a bottom, and a sensing element inserted into the sensor case such as to extend through the sensor case, the interior of the sensor case being filled with a resin. Thanks to the construction wherein the perimeter of the sensing element is protected by the sensor case and the filling resin, and that the sensing element is formed in one piece with the sensor case, there is no danger that the leads break off the sensing element, whereby handling is made easier. This also enables temperature detection with even higher responsiveness, because heat is conducted directly from the bottom wall of the temperature detection hole to the sensing element.

The temperature sensor is further provided with a wire-holding hook for holding the wires, so that stress concentrations in the wires in a direction in which they are pulled out of the temperature sensor, which may cause wire rupture, can be prevented, even when an external force is accidentally applied to the wires.

The engaging hook is elastically deformable in a direction that is perpendicular to an axis direction of the temperature detection hole, and the temperature sensor comprises a protrusion that restricts displacement of the engaging hook, so that excessive deformation that may cause breaking of the engaging hooks when mounting or removing the temperature sensor can be prevented.

The temperature detection hole of the battery case, the sensor case of the temperature sensor and the mounting means are all made of synthetic resin, so that heat is not dispersed to the outside, thereby making appropriate temperature detection possible.

The temperature detection hole of the battery case is arranged such that its bottom wall is in contact with or in close proximity to a maximum temperature location of the elements for electromotive force, for example, at an upper central portion of the elements for electromotive force or near the collectors, where the temperature is the highest and heat is dissipated the slowest, whereby the temperature of the battery can be detected with high responsiveness.

While novel features of the invention are set forth in the preceding, the invention, both as to organization and content, can be further understood and appreciated, along with other objects and features thereof, from the following detailed description and examples when taken in conjunction with the attached drawings.

DESCRIPTION OF PREFERRED EMBODIMENTS

Preferred embodiments of a rechargeable battery in accordance with the present invention will be hereinafter described with reference to FIGS. 1 to 4.

Figure 1:
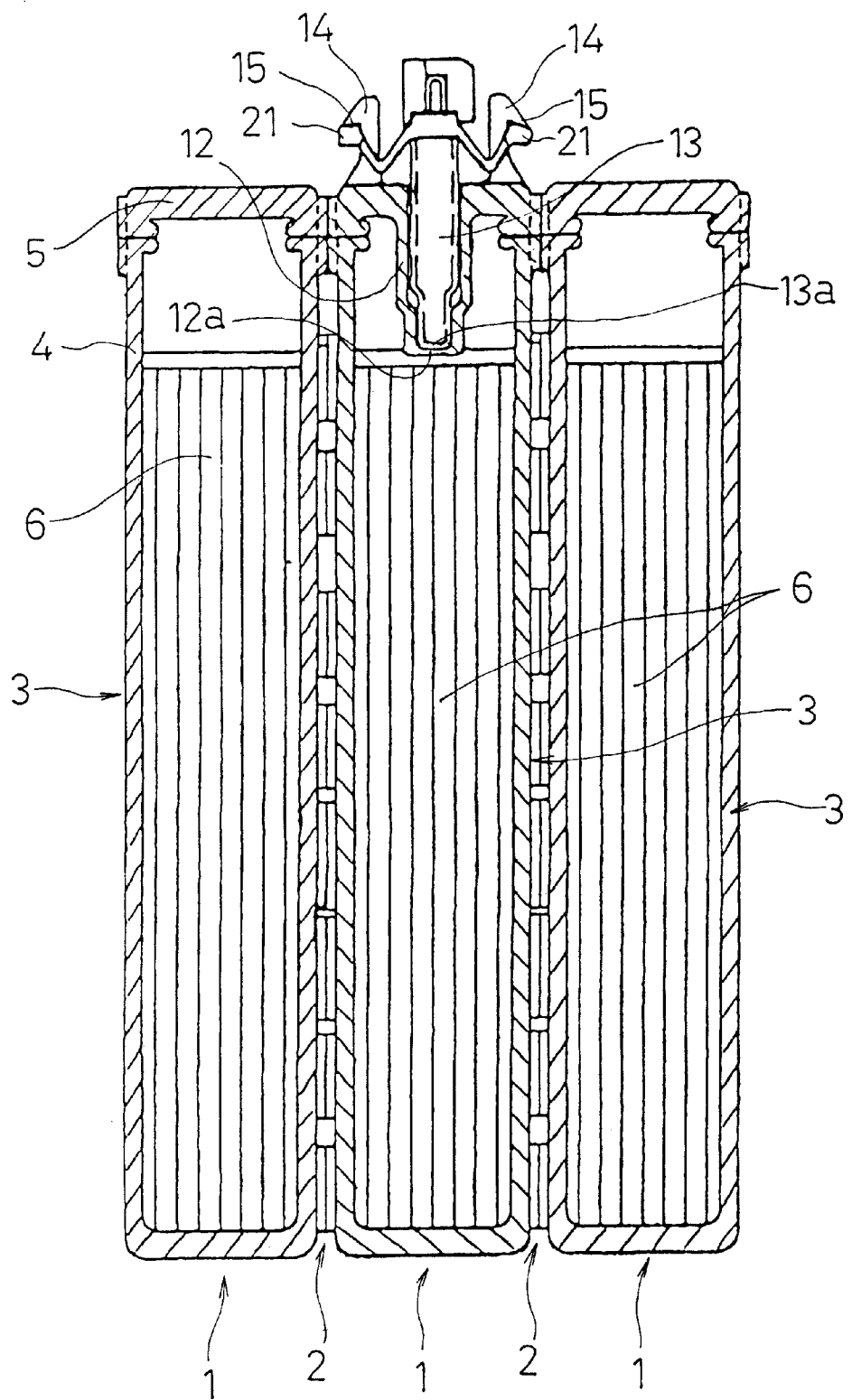
FIG. 1 is a vertical cross-sectional front view of a rechargeable battery according to one embodiment of the present invention.

The present invention is applied to a battery pack of nickel metal hydride batteries, which is suitable for use as a drive power source for an electric vehicle. As shown in FIG. 1, a plurality of rechargeable batteries 1 are arranged side by side, and connected electrically in series for use. Coolant passages 2 are formed between opposing walls of adjacent batteries 1 for forcibly cooling the batteries 1.

Figure 2:
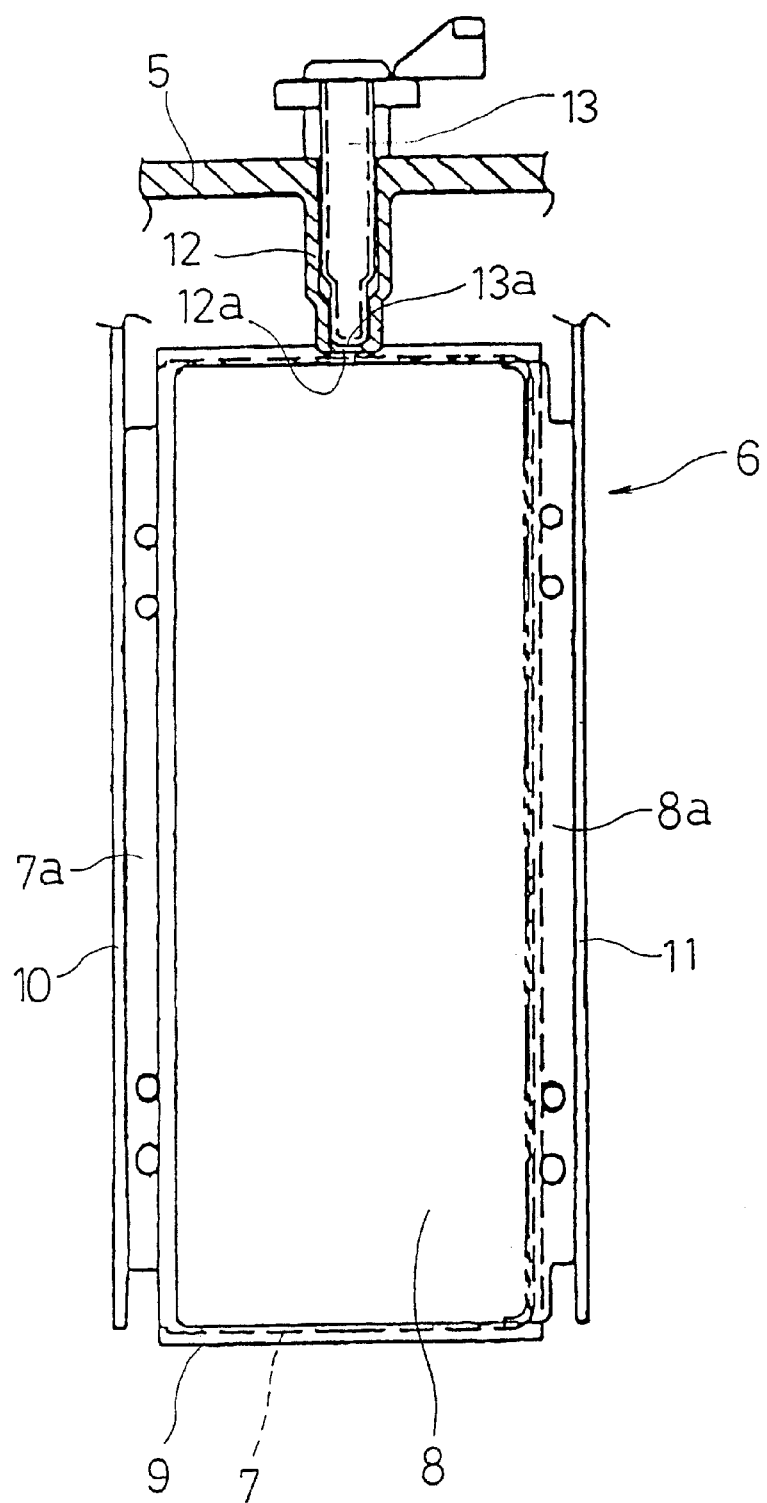
FIG. 2 is a vertical cross-sectional lateral view of the same embodiment.

As shown in FIG. 1 and in FIG. 2, the rechargeable batteries 1 each comprise battery cases 3 made of hollow prismatic case bodies 4, of which upper open ends are closed integrally by a lid member 5. Elements for electromotive force 6 are accommodated inside each of the battery cases 3. The case bodies 4 and the lid member 5 that constitute battery cases 3 are made of a synthetic resin material, such as a PP/PPE alloy. Positive electrode terminals and negative electrode terminals (not shown in the drawings) are arranged at both ends of the battery cases 3 in a longitudinal direction and a safety vent (not shown in the drawings) for releasing pressure when the pressure in the battery cases 3 has exceeded a certain value is arranged at a suitable location in the lid member 5.

As shown in FIG. 2, the elements for electromotive force 6 are constituted by layering positive electrode plates 7 comprising Ni foamed metal and negative electrode plates 8 comprising Ni punched metal coated with active materials, with intervening separators 9 in the form of a bag covering the positive electrode plates 7. These electrode plates are accommodated inside the battery cases 3 together with a liquid electrolyte. The lateral edges of the group of positive electrode plates 7 protrude beyond the group of negative electrode plates 8 on one side, and the lateral edges of the group of negative electrode plates 8 protrude beyond the group of positive electrode plates 7 on the opposite side, and these protruding lateral portions form the lead portions 7a and 8a, which are coupled together as one by collector plates 10, 11. The collector plates 10, 11 are connected to the above-mentioned positive electrode terminals and negative electrode terminals, respectively.

A temperature detection hole 12 having a bottom, which is sealed against the inside of the battery cases 3 and open to the outside, is formed substantially at the center of the lid member 5 of the battery cases 3. A bottom wall 12a at the bottom end of this temperature detection hole 12 is arranged in contact with or in close proximity to an upper central portion of the elements for electromotive force 6, which exhibits a maximum temperature inside the rechargeable battery. A temperature sensor 13 is mounted removably in the temperature detection hole 12 and the sensor end 13a at the tip of the temperature sensor 13 is pressed against the bottom wall 12a of the temperature detection hole 12a.

Figure 3:
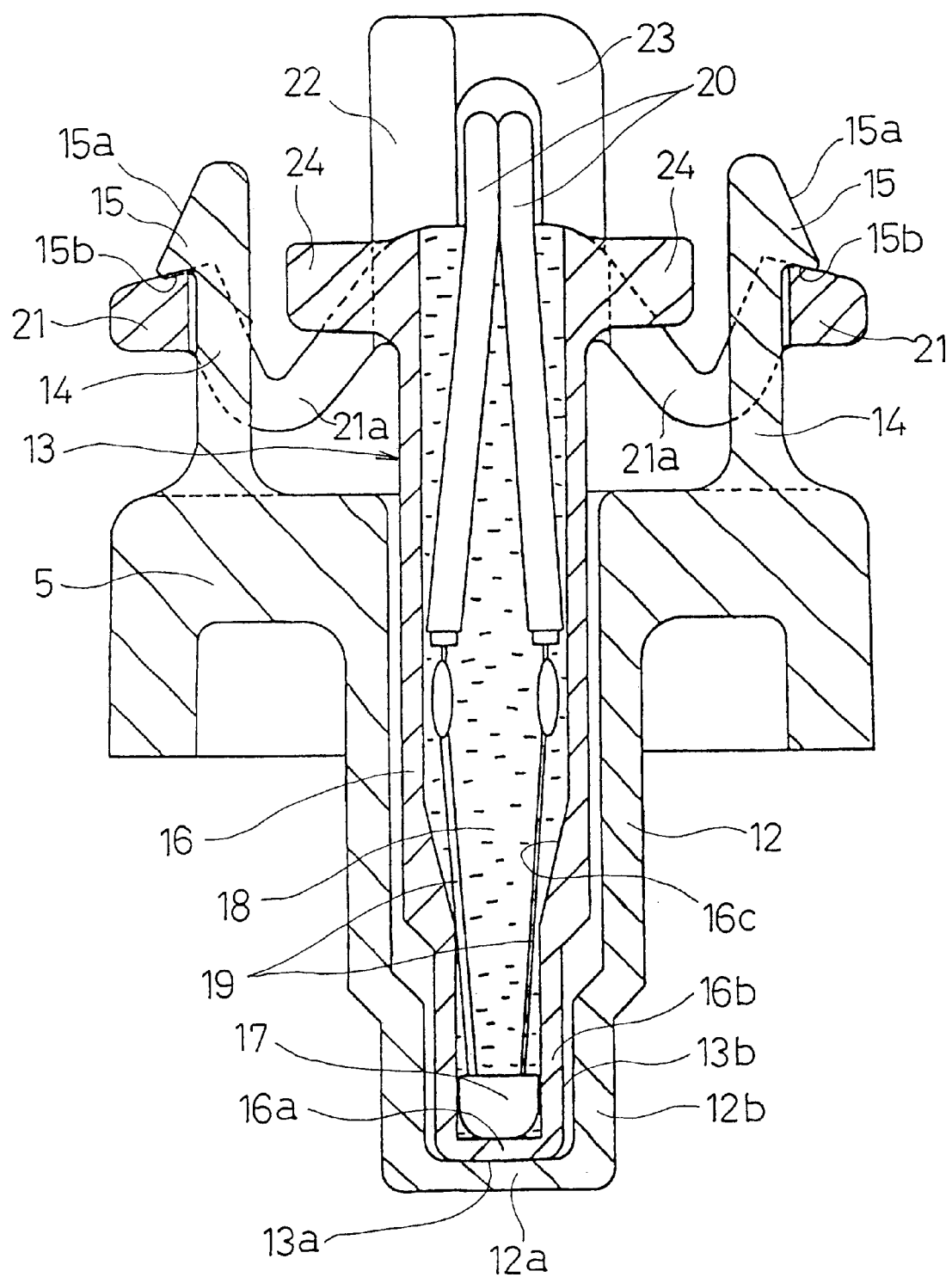
FIG. 3 is a detailed magnified vertical cross-sectional front view of the temperature detection portion of the same embodiment.

The configuration of this temperature detection portion will be described in more detail with reference to FIGS. 3 and 4. A small-diameter portion 12b whose diameter is smaller than that of the other portions is formed at the bottom end of the temperature detection hole 12. Moreover, a pair of engaging hooks 14 protrude from the two lateral portions of the upper open end of the temperature detection hole 12. These engaging hooks 14 are elastically deformable, so that their tip portions can be moved closer to or away from each other. The engaging hooks 14 are formed with engaging claws 15 having a substantially triangular cross section and protruding toward the outside from the upper ends of the engaging hooks 14. The engaging claws 15 comprise guide faces 15a that incline toward the outside from the top ends of the engaging claws 15 and engaging faces 15b facing downward that are formed continuously from the lower ends of the guide faces 15a.

The temperature sensor 13 comprises a cylindrical sensor case 16 having a bottom made of a synthetic resin, such as PE. A sensor element 17, such as a thermistor, is inserted into this sensor case 16 such that the sensor element 17 contacts the bottom wall 16a of the sensor case 16. The sensor case 16 is then filled with resin 18, such as an epoxy resin. At the lower end of the sensor case 16, a small-diameter portion 16b is formed so that the sensor element 17 can closely fit in the tip of the sensor case 16. Correspondingly, the temperature sensor 13 has a small-diameter portion 13b that fits into the small-diameter portion 12b of the temperature detection hole 12. Moreover, in the lower part of the inner wall of the sensor case 16, a tapered guide wall 16c is formed, so that the sensor element 17 can be inserted smoothly into the small-diameter portion 16b. Numeral 19 denotes leads extending from the sensor element 17, and numeral 20 denotes wires connected to the upper ends of the leads 19. The sensor element 17, the leads 19 and the wires 20 up to their distal ends are inserted into the sensor case 16 and integrated into one piece by filling the sensor case 16 with the resin 18.

A pair of engaging flanges 21, which are formed in the shape of square frames when viewed from above so that the two engaging hooks 14 can be introduced therethrough and which can be elastically bent in a vertical direction, protrude from both sides of the upper end of the sensor case 16. In the present embodiment, the engaging flanges 21 are formed with curved portions 21a in the shape of letter "V" when viewed from the front at intermediate positions of the engaging flanges 21. When mounting the temperature sensor into the temperature detection hole 12, the engaging hooks 14 are introduced through the engaging flanges 21, so that the engaging claws 15 are hooked on the engaging flanges 21 in a state that the resilient engaging flanges 21 are elastically deformed. Thus the temperature sensor 13 is pressed against the bottom wall 12a of the temperature detection hole 12 by the elastic recovery of the resilient engaging flanges 21.

Figure 4:
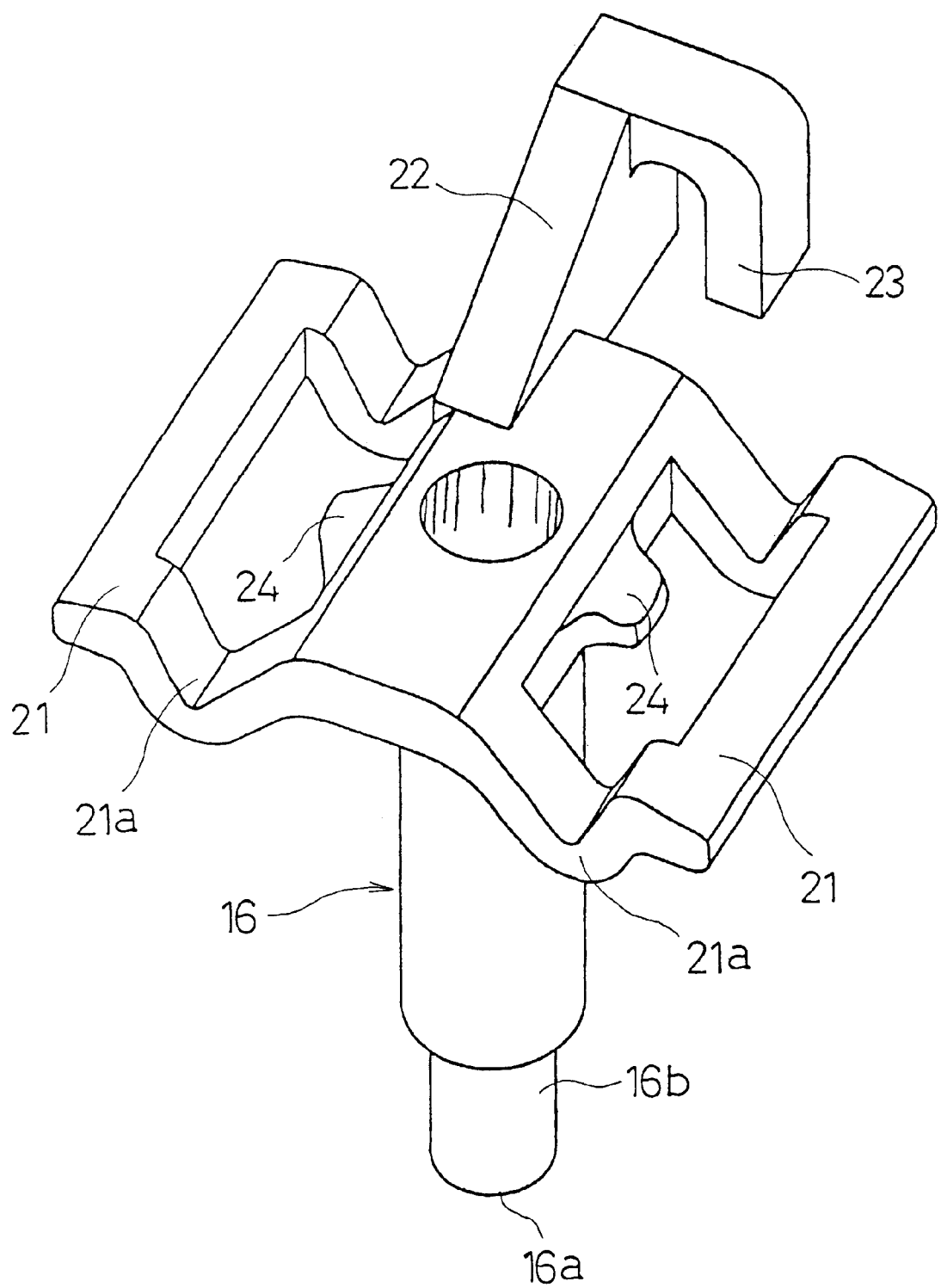
FIG. 4 is a perspective view of the sensor case in the same embodiment.

Referring to FIG. 4, a support piece 22 extends obliquely upward from the upper end of the sensor case 16 on one side in a direction orthogonal to the direction in which the two engaging flanges 21 oppose each other, and a U-shaped wire-holding hook 23 which faces downward and holds the wires 20 from above is provided at the tip of the support piece 22. In addition, protrusions 24 are formed on both sides of the upper end of the sensor case 16 toward the center of the inner side of the frame-shaped engaging flanges 21, so as to restrain the amount of displacement of the engaging hooks 14 to a certain extent.

In the rechargeable battery with this configuration, while the inside of the battery cases 3 is sealed with the bottom wall 12a of the temperature detection hole 12, the temperature is detected by the sensor end 13a of the temperature sensor 13 that is pressed against the bottom wall 12a of the temperature detection hole 12, whereby temperature detection with high accuracy and responsiveness can be achieved. Also, because the bottom wall 12a of the temperature detection hole 12 is arranged in contact with or in close proximity to an upper central portion of the elements for electromotive force 6, the temperature at the portion of the battery where the temperature is the highest can be quickly detected. Precise battery control is possible by detecting the battery temperature with high accuracy and responsiveness in this manner, whereby the life-time and the reliability of the battery can be improved.

Furthermore, because the temperature detection hole 12 and the engaging hooks 14 of the battery cases 3, as well as the sensor case 16 and the engaging flanges 21 of the temperature sensor 13 are all made of a synthetic resin, their thermal conductivity is low. As compared to a case wherein the case where these parts are made of metal, temperature detection with high precision is possible, as there is no risk that heat is dispersed to the outside.

When mounting the temperature sensor 13, it is simply inserted into the temperature detection hole 12 of the battery case 3, introducing the engaging hooks 14 through the frame-shaped engaging flanges 21, and pushing down the engaging flanges 21 to slide downward along the guide faces 15a of the engaging claws 15, whereby the engaging flanges 21 engage with the engaging faces 15b as elastically deformed downwards. Thus, when the temperature sensor 13 has been mounted, the elastic restorative force of the engaging flanges 21 presses the sensing end 13a of the temperature sensor 13 securely against the bottom wall 12a of the temperature detection hole 12.

Removal of the temperature sensor 13 can be accomplished also with a simple operation by releasing the engagement of the engaging faces 15b of the engaging claws 15 with the engaging flanges 21, by pushing the pair of engaging hooks 14 toward the inside. During the removal, the displacement of the engaging hooks 14 is restricted by the protrusions 24, so that there is no danger of deforming the engaging hooks 14 excessively and damaging same. Thanks to these simple operations for mounting and removing the temperature sensor 13, the operability when attaching the temperature sensor 13 and when replacing the rechargeable batteries 1 for maintenance is good.

Moreover, the temperature detection hole 12 is provided with a small-diameter portion 12b at the bottom end, and the temperature sensor 13 is provided with a small-diameter portion 13b at the lower end, whose diameters are smaller than those of other portions, so that heat is conducted to the sensing end 13a of the temperature sensor 13 not only from the bottom wall 12a of the temperature detection hole 12, but also from the vicinity thereof. Furthermore, the thermal capacity of the temperature detection portion is small. This enables temperature detection with even higher precision and responsiveness.

Moreover, the temperature sensor 13 itself is made by inserting the sensor element 17 into the cylindrical sensor case 16 having a bottom such as to contact the bottom wall 16a of the sensor case 16, and by filling the sensor case 16 with resin 18 to form one integrated piece. There is thus no danger that the leads 19 break off the sensor element 17, and handling of the temperature sensor 16 can thereby be made easy. In addition, such construction makes thermal conduction smooth, and enables temperature detection with high responsiveness. The responsiveness can be improved by making the bottom wall 16a of the sensor case 16 not thicker than, for example, 0.5 mm. In this case, it is preferable that also the bottom wall 12a of the temperature detection hole 12 be made not thicker than, for example, 0.7 mm.

Since the temperature sensor 13 is provided with a wire-holding hook 23 for holding the wires 20, even when an external force is accidentally applied to the wires 20, there will be no stress concentrating at the ends of the wires 20 led out from the temperature sensor 13, and the wires will be prevented from rupturing.

Figure 5:
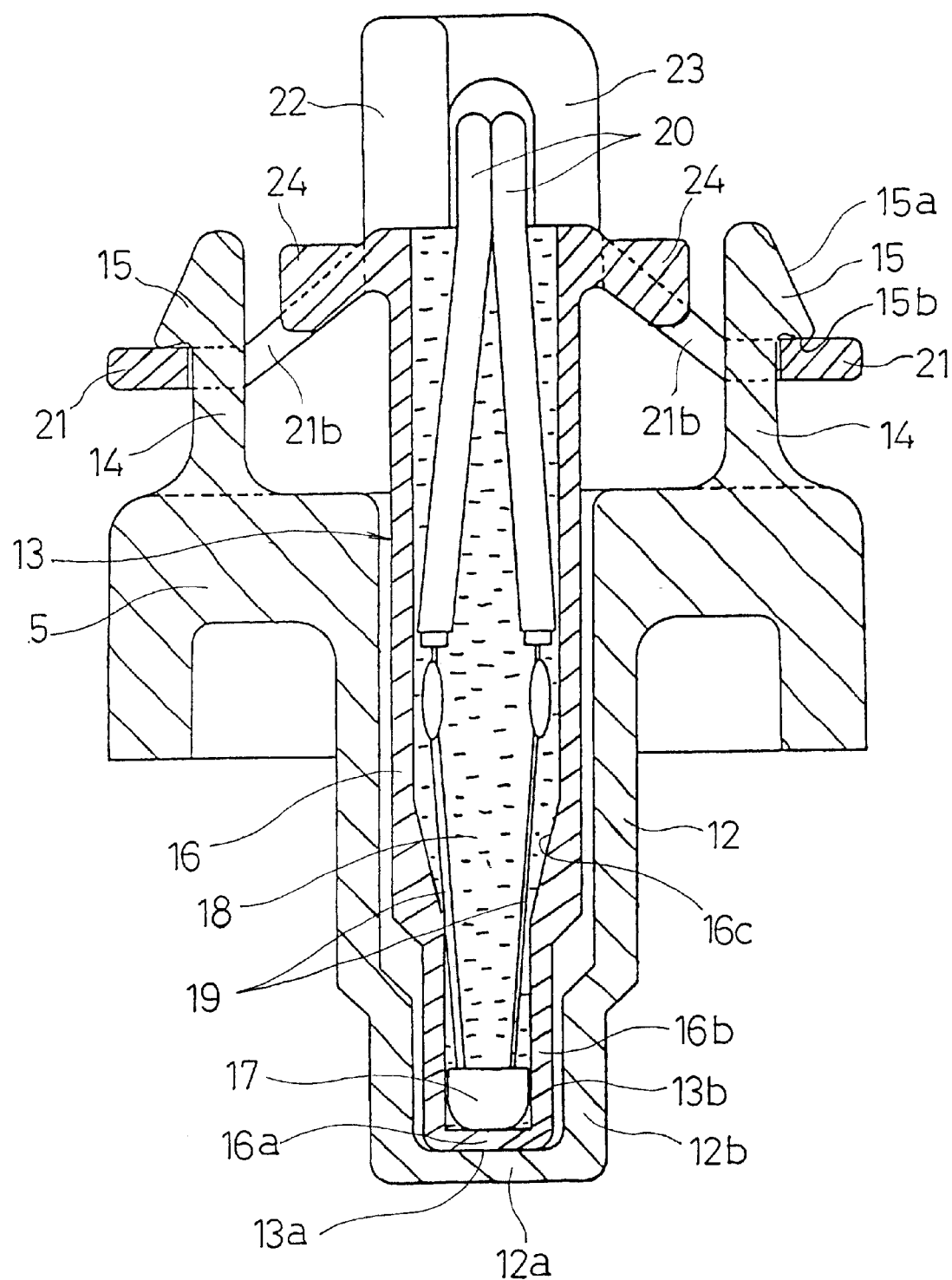
FIG. 5 is a detailed magnified vertical cross-sectional front view of the temperature detection portion in a modified example of the same embodiment.

In the example shown in the drawings, curved portions 21a are formed at intermediate positions of the engaging flanges 21 of the temperature sensor 13. When the engaging flanges 21 are pushed downward while sliding along the guide faces 15a of the engaging claws 15 of the engaging hooks 14, the engaging hooks 14 are elastically deformed inward, and also the engaging flanges 21 are expanded somewhat at the curved portions 21a. However, it is also possible to omit the curved portions 21a in the intermediate portions of the engaging flanges 21, as shown in the example in FIG. 5, and to configure the intermediate portions as simple connection pieces 21b extending slantly downward.

Next, another embodiment of the present invention is described with reference to FIG. 6. For the temperature sensor 13 of the above described embodiment, an example has been shown, in which a sensor element 17, such as a thermistor, is inserted into a cylindrical sensor case 16 having a bottom and contacted with the bottom wall 16a of the sensor case 16. In this embodiment, the sensor element 17 is inserted into a cylindrical sensor case 26 without a bottom wall so that the distal end thereof extends through the open end 26a of the sensor case 26, and the inside of the sensor case 26 is filled with a resin 18. Numeral 26b denotes a small-diameter portion, and numeral 26c denotes a tapered guide wall, which correspond to the small-diameter portion 16b and the tapered guide wall 16c of the foregoing embodiment, respectively.

With this embodiment, handling of the temperature sensor is easy and there is no danger that the leads 19 break off the sensor element 17, because the perimeter of the sensor element 17 is protected by the sensor case 26 and the filling resin 18, and the sensor element 17 is formed in one piece with the sensor case 26. Moreover, heat is conducted directly from the bottom wall 12a of the temperature detection hole 12 to the sensor element 17, so that temperature detection with even better responsiveness is possible.

Figure 6:
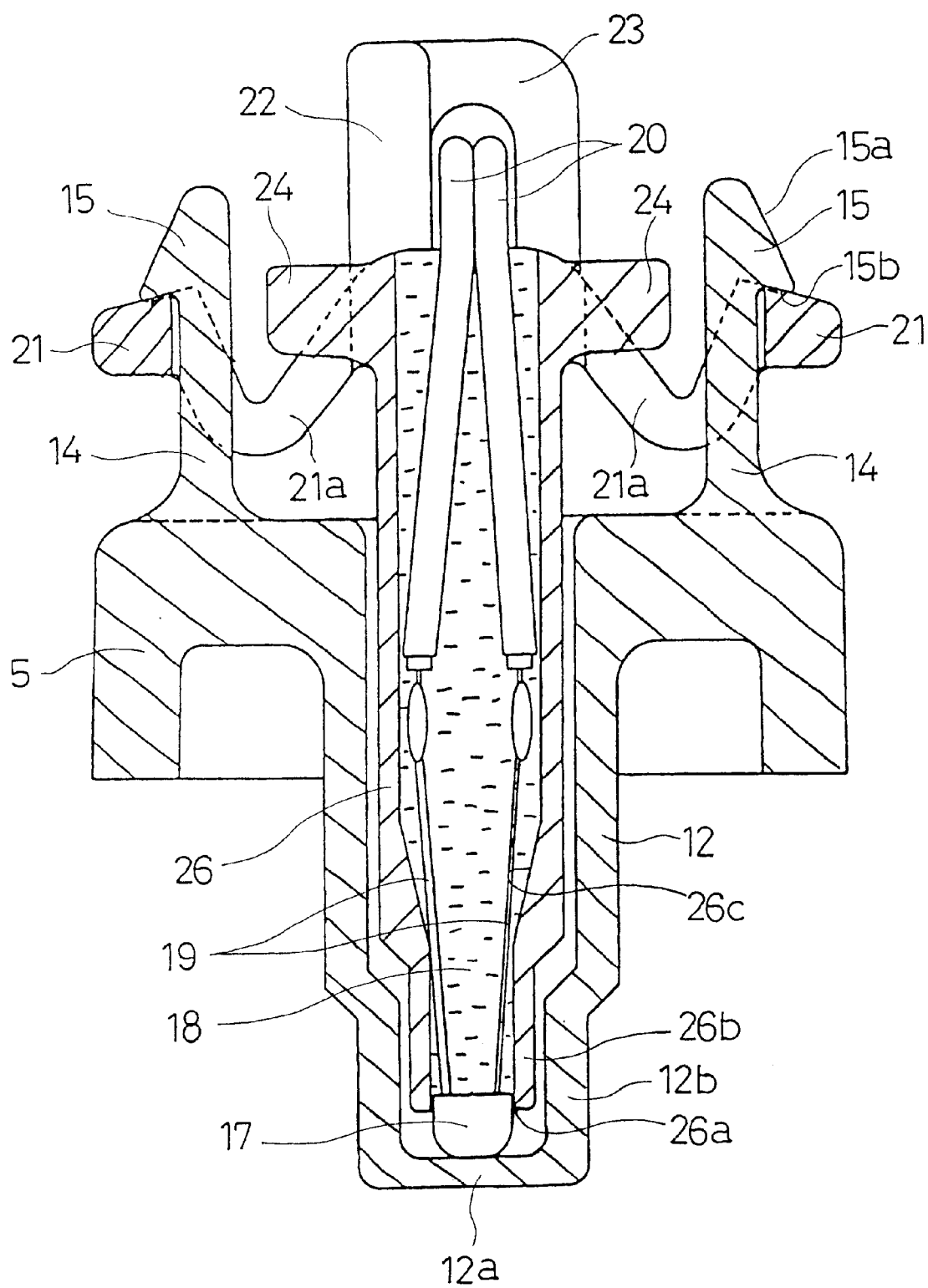
FIG. 6 is a detailed magnified vertical cross-sectional front view of the temperature detection portion in another embodiment of the rechargeable battery of the present invention.
Figure 7:
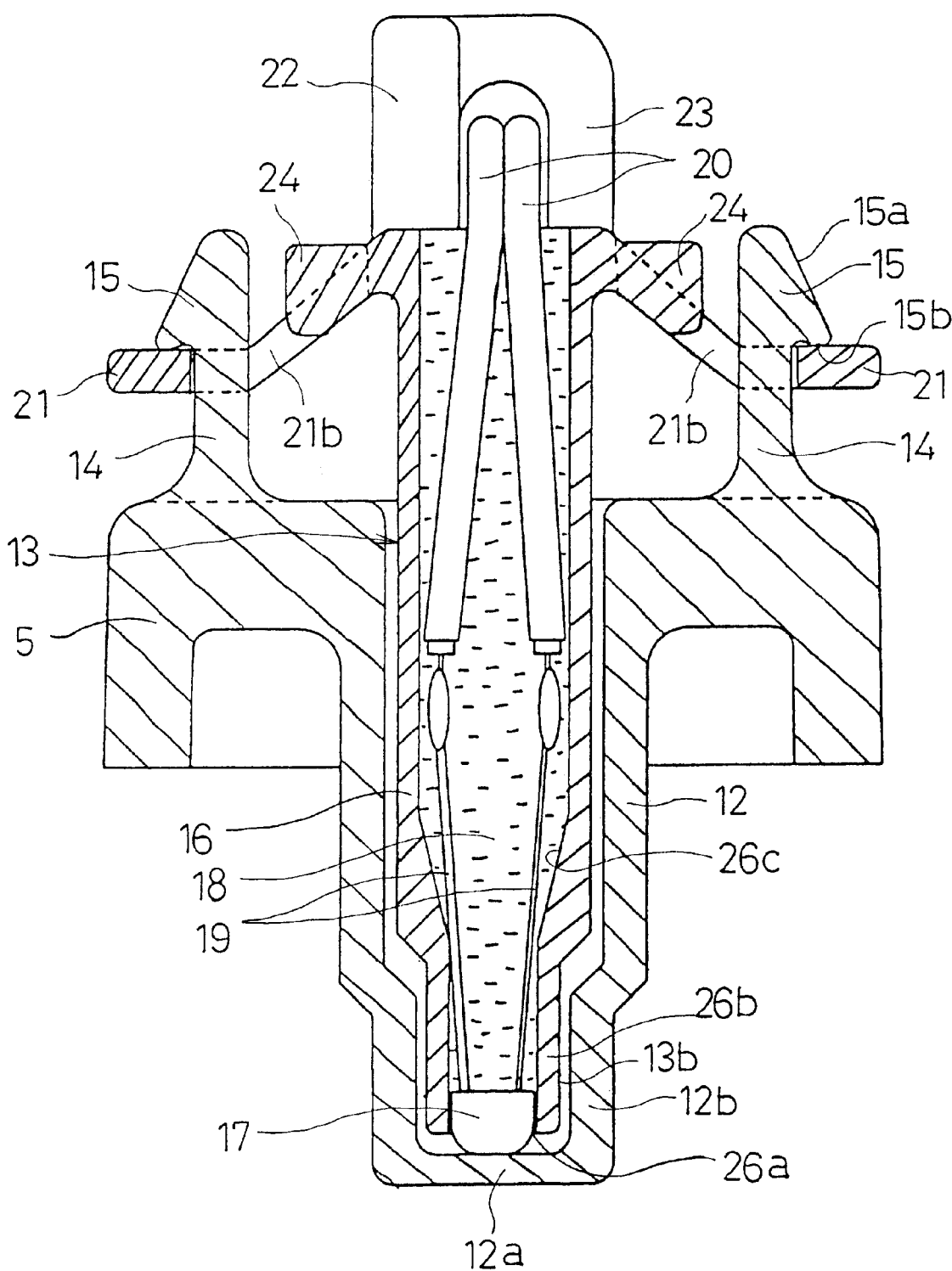
FIG. 7 is a detailed magnified vertical cross-sectional front view of the temperature detection portion in a modified example of the same embodiment.

FIG. 6 shows one example, in which curved portions 21a are formed at intermediate portions of the engaging flanges 21, but it is also possible to omit the curved portions 21a in the intermediate portions of the engaging flanges 21, as shown in the example in FIG. 7, and to configure the intermediate portions as simple connection pieces 21b extending slantly downward.

According to the rechargeable battery of the present invention, as described above, sealed battery cases accommodating therein elements for electromotive force are provided with a temperature detection hole having a bottom, which is sealed against the inside of the battery cases and open to the outside, and a mounting means is provided for mounting the temperature sensor in the temperature detection hole such as to be removable and such that its sensor end is pressed against the bottom wall of the temperature detection hole. Temperature detection is thereby possible while maintaining the inside of the battery cases tightly sealed. Since the sensor end of the temperature sensor is pressed against the bottom wall of the temperature detection hole, the battery temperature can be detected with high precision and responsiveness. Moreover, as the temperature sensor is removably mounted to the temperature detection hole, the operability when attaching the temperature sensor and when replacing the batteries for maintenance is good.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A rechargeable battery, comprising:
   a battery case accommodating therein elements for electromotive force in a sealed condition;
   a temperature detection hole which is defined by a cylindrical cavity having a bottom formed in the battery case;
   a temperature sensor mounted in the temperature detection hole, having a sensing end at a lower end thereof; and
   a mounting means for mounting the temperature sensor removably in the temperature detection hole such that the sensing end at the lower end of the temperature sensor is tightly pressed against the bottom of the temperature detection hole.

2. The rechargeable battery of claim 1, wherein
   an engaging hook is provided at an edge portion of the temperature detection hole in the battery case;
   the temperature sensor is provided with an engaging flange that is elastically deformable; and
   when the engaging flange is engaged in elastic deformation with the engaging hook, the temperature sensor is pressed downward against the bottom of the temperature detection hole by an elastic restorative force of the engaging flange.

3. The rechargeable battery of claim 2, wherein the engaging hook is elastically deformable in a direction that is perpendicular to an axis direction of the temperature detection hole; and
   the temperature sensor comprises a protrusion that restricts displacement of the engaging hook.

4. The rechargeable battery of claim 1, wherein an end portion of the temperature detection hole and an end portion of the temperature sensor have a smaller diameter than other portions.

5. The rechargeable battery of claim 1, wherein the temperature sensor comprises a cylindrical sensor case having a bottom wall, and a sensing element inserted into the sensor case such as to contact the bottom wall of the sensor case, the interior of the sensor case being filled with a resin.

6. The rechargeable battery of claim 5, wherein the temperature sensor is provided with a wire-holding hook for holding a wire connected to the sensing element.

7. The rechargeable battery of claim 5, wherein the temperature detection hole, the sensor case of the temperature sensor and the mounting means are made of synthetic resin.

8. The rechargeable battery of claim 1, wherein the temperature sensor comprises a cylindrical sensor case without a bottom, and a sensing element inserted into the sensor case such as to extend through the sensor case, the interior of the sensor case being filled with a resin.

9. The rechargeable battery of claim 8, wherein the temperature sensor is provided with a wire-holding hook for holding a wire connected to the sensing element.

10. The rechargeable battery of claim 8, wherein the temperature detection hole, the sensor case of the temperature sensor and the mounting means are made of synthetic resin.

11. The rechargeable battery of claim 1, wherein the bottom wall of the temperature detection hole is in contact with or in proximity to a location where temperature of the elements for electromotive force is highest.

12. A rechargeable battery, comprising:
   a battery case that accommodates therein elements for electromotive force in a sealed condition;
   a temperature detection hole defined by a cylindrical cavity having a bottom formed in said battery case;
   a temperature sensor mounted in said temperature detection hole and having a sensing end at a lower end thereof; and
   a mounting structure with which the temperature sensor is removably mounted in said temperature detection hole such that the sensing end at said lower end of said temperature sensor is biased against said bottom of the temperature detection hole.

13. The rechargeable battery of claim 12, wherein:
   said temperature sensor comprises an engaging flange that is elastically deformable;

an engaging hook is provided at an edge portion of said temperature detection hole in said battery case; and when said engaging flange is engaged in elastic deformation with said engaging hook, said temperature sensor is pressed downward against the bottom of the temperature detection hole by an elastic restorative force of said engaging flange.

14. The rechargeable battery of claim 13, wherein:

said engaging hook is elastically deformable in a direction that is perpendicular to an axis direction of said temperature detection hole; and said temperature sensor further comprises a protrusion configured to restrict displacement of said engaging hook.

15. The rechargeable battery of claim 12, wherein an end portion of said temperature detection hole and an end portion of said temperature sensor have a smaller diameter than other portions of said temperature detection hole.

16. The rechargeable battery of claim 12, wherein said temperature sensor further comprises:

a cylindrical sensor case having a bottom wall and an interior, said interior filled with a resin; and a sensing element inserted into the sensor case and configured to contact the bottom wall of the sensor case.

17. The rechargeable battery of claim 16, wherein said temperature sensor is provided with a wire-holding hook configured to hold a wire connected to said sensing element.

18. The rechargeable battery of claim 16, wherein said temperature detection hole, said sensor case of said temperature sensor and the mounting structure are each made of synthetic resin.

19. The rechargeable battery of claim 12, wherein said temperature sensor comprises a cylindrical sensor case without a bottom, and a sensing element inserted into and extending through said sensor case, the interior of said sensor case filled with a resin.

20. The rechargeable battery of claim 19, wherein said temperature sensor is provided with a wire-holding hook configured to hold a wire connected to said sensing element.

21. The rechargeable battery of claim 19, wherein said temperature detection hole, said sensor case of said temperature sensor and the mounting means are made of synthetic resin.

22. The rechargeable battery of claim 12, wherein said temperature detection hole comprises a bottom wall, said temperature detection hole being one of in contact with and in proximity to a location where temperature of the elements for electromotive force is highest.

23. A rechargeable battery, comprising:

a battery case accommodating therein elements for electromotive force in a sealed condition;

a temperature detection hole which is defined by a cylindrical cavity having a bottom formed substantially at the center of a lid member of the battery case;

a temperature sensor mounted in the temperature detection hole, having a sensing end at a lower end thereof; and a mounting means for mounting the temperature sensor removably in the temperature detection hole such that the sensing end at the lower end of the temperature sensor is tightly pressed against the bottom of the temperature detection hole.

24. A rechargeable battery, comprising:

a battery case that accommodate therein elements for electromotive force in a sealed condition;

a temperature detection hole defined by a cylindrical cavity having a bottom formed substantially at the center of a lid member of said battery case;

a temperature sensor mounted in said temperature detection hole and having a sensing end at a lower end thereof; and a mounting structure with which the temperature sensor is removably mounted in said temperature detection hole such that the sensing end at said lower end of said temperature sensor is biased against said bottom of the temperature detection hole.

* * * * *

UNITED STATES PATENT AND TRADEMARK OFFICE
CERTIFICATE OF CORRECTION

PATENT NO.    : 6,610,439 B1
DATED         : August 26, 2003
INVENTOR(S)   : S. Kimoto et al.

It is certified that error appears in the above-identified patent and that said Letters Patent is hereby corrected as shown below:

<u>Column 10,</u>
Line 26, "accommodate" should be -- accommodates --.

Signed and Sealed this

Fifteenth Day of June, 2004

JON W. DUDAS
*Acting Director of the United States Patent and Trademark Office*